United States Patent [19]

Nathenson et al.

[11] 4,365,176

[45] Dec. 21, 1982

[54] LIQUID COOLING SYSTEM FOR A HYDROGENERATOR ROTOR

[75] Inventors: Richard D. Nathenson, Pittsburgh; Charles W. Pipich, Monroeville, both of Pa.; Joseph R. Kopnitsky, deceased, late of Trafford, Pa., by Mary C. Kopnitsky, executrix

[73] Assignee: Westinghouse Electric Corp., Pittsburgh, Pa.

[21] Appl. No.: 249,305

[22] Filed: Mar. 31, 1981

[51] Int. Cl.³ ............................................ H02K 9/00
[52] U.S. Cl. .................................... 310/54; 310/61; 310/64; 310/71; 310/269
[58] Field of Search ............... 310/53, 54, 57, 58, 310/59, 60 R, 60 A, 61, 64, 65, 71, 269, 201; 62/55, 505; 290/52

[56] References Cited

U.S. PATENT DOCUMENTS

| | | | |
|---|---|---|---|
| 3,075,104 | 1/1963 | Willyoung et al. | 310/54 |
| 3,131,321 | 4/1964 | Gibbs et al. | 310/54 |
| 3,439,203 | 4/1969 | Kolzumi | 310/54 |
| 3,459,979 | 8/1969 | Dickinson | 310/54 |
| 3,740,595 | 6/1973 | Heller et al. | 310/64 |
| 3,878,413 | 4/1975 | Madsen | 310/59 |
| 3,939,368 | 2/1976 | Albaric et al. | 310/59 |
| 4,048,528 | 9/1977 | Whitney | 310/54 |
| 4,199,700 | 4/1980 | Daugherty et al. | 310/64 |
| 4,303,842 | 12/1981 | Nathenson | 310/64 |

Primary Examiner—R. Skudy
Attorney, Agent, or Firm—William D. Lanyi

[57] ABSTRACT

A liquid cooling system for a dynamoelectric machine's rotor winding. Concentrically arranged intake and outtake coolant pipes extend a desired axial distance within a centrally arranged bore in the rotor. Both pipes are joined to a distribution block also disposed in the rotor bore. The distribution block transmits coolant from the intake pipe to arcuately-shaped coolant distribution manifolds through radially-directed pipes and transmits coolant from arcuately-shaped coolant collection manifolds to the outtake pipe through radially-directed pipes. The manifolds are fluidly connected to the rotor winding either by rigid non-conducting tubing having bends therein for permitting thermal expansion thereof or flexible insulation tubing such as Teflon ®.

12 Claims, 13 Drawing Figures

LIQUID COOLING SYSTEM FOR A HYDROGENERATOR ROTOR

BACKGROUND OF THE INVENTION

This invention relates to an internally-cooled rotor winding for a dynamoelectric machine, and more particularly to a system for directing liquid coolant to a salient-pole rotor winding of a hydrogenerator.

Large hydrogenerators are typically of a salient-pole rotor construction. Each pole includes a helically-wound conductor coil. A preferred geometry for the salient poles of a hydrogenerator is set forth in U.S. Pat. No. 4,303,842 issued on Dec. 1, 1981 to R. D. Nathenson, now U.S. Pat. No. 4,303,842, assigned to Westinghouse Electric Corporation and incorporated by reference herein. A system for bringing the electrical leads from the individual poles to the rotor shaft and out of the machine is disclosed in copending application, U.S. Ser. No. 249,306, filed on Mar. 31, 1981 by the inventors herein, commonly assigned, and likewise incorporated by reference herein.

Desirable is a practical structure and system for supplying liquid coolant to the salient poles of a hydrogenerator. Such a design should be hydraulically, thermally, and mechanically sound, and offer effective cooling of the rotor of large hydrogenerators.

SUMMARY OF THE INVENTION

In general, a liquid-cooling system for a dynamoelectric machine's rotor is presented and claimed herein. The rotor includes a rotatably mounted shaft with a central bore therethrough; a rim mounted on said shaft; and a multiplicity of salient poles mounted about the periphery of said rim, each of said poles including a coil of conductor.

The cooling system comprises the following elements. A plurality of axial coolant pipes are disposed within the shaft's bore and include an intake pipe, and an outtake pipe disposed concentrically about the intake pipe. A rotor inlet pipe is connected to the axial coolant intake, and connectable at its other end to an external coolant supply system. A rotor outlet pipe is connected to said axial coolant outtake pipe and likewise connectable to said external coolant supply system. A manifold is provided which includes a plurality of arcuately-shaped coolant pipes slidably attached to the rotor's rim. Preferably, four such pipes are used in the manifold, each one being semicircular. In this case the pipes lie in axially spaced-apart planes, with two of the pipes in each plane. A plurality of radially-directed pipes hydraulically connect the manifold to the center of the rotor shaft. Within the bore of the rotor shaft is a coolant distribution block which connects the axial pipes to the radial pipes. The distribution block includes a cover portion and a base having pipe connecting features. The block's pipe-connecting features include a plurality of chambers machined into the block, for example, by a spherical cutter. The chambers are defined by inner-wall structures which separate hot-coolant chambers from cold-coolant chambers. The chambers are in hydraulic communication with the appropriate radial and axial pipes. For example, the axial pipes are welded to the distribution block while the radial pipes are fastened by mechanical joints. Preferably, each of mechanical joints includes a hex-shaped through-hole. Each joint is welded to a radial pipe, and then, during the assembly operation, the radial pipes may be installed in the distribution block with the aid of a hex wrench that is inserted down the length of the radial pipes. The coolant flows from the manifold to the individual poles via pole connecting means which preferably includes stainless steel tubing having S-bends and an insulating connector which connects the tubing to the pole. Alternately, the connecting means constitutes a braided Teflon ® hose which is fastened to the pole by mechanical fittings.

This cooling system is designed to facilitate assembly and manufacture. Also, it accommodates various thermal differential movement and thereby minimizes thermal stress. Overall it is a hydraulically and mechanically sound design for a hydrorotor.

BRIEF DESCRIPTION OF THE DRAWINGS

The objects and advantages of the invention will become more apparent from reading the following detailed description in connection with the accompanying drawings, in which.

DESCRIPTION OF THE PREFERRED EMBODIMENT

Figure 1:
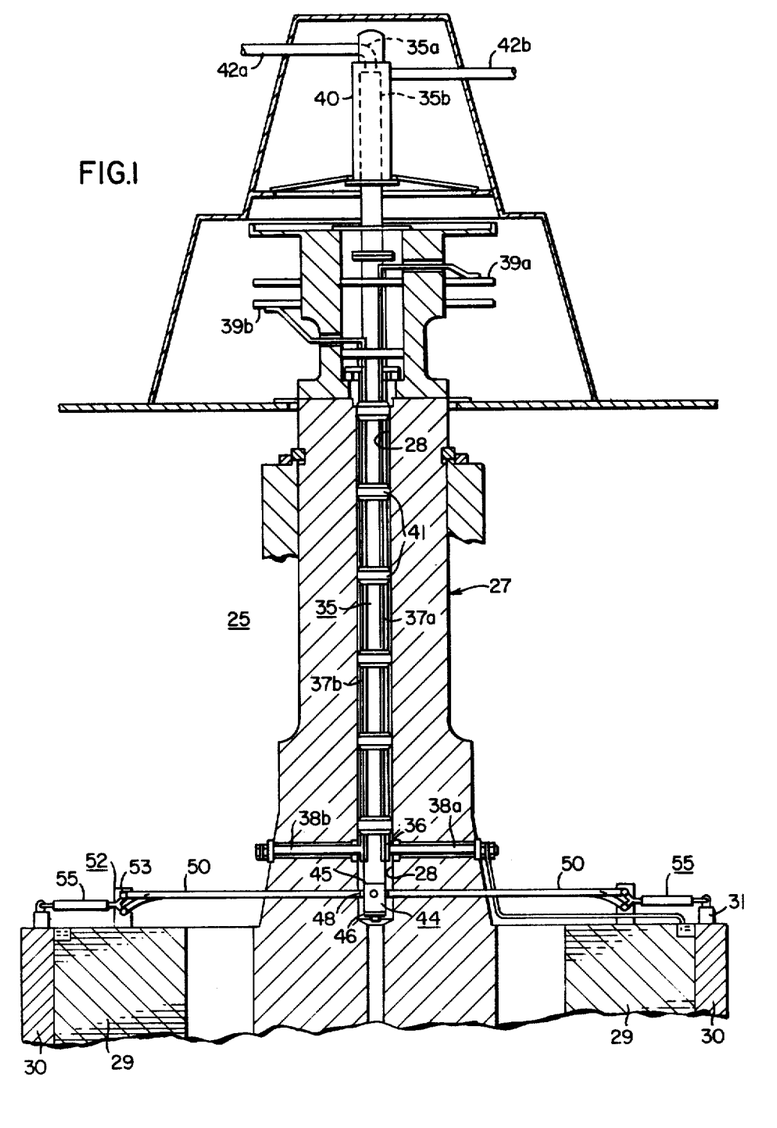
FIG. 1 is a partial sectional view of a hydrogenerator's rotor incorporating the invention.

Referring to the drawings, like reference numerals refer to like features in all of the figures. FIG. 1 is a partial sectional view of a rotor 25 for a dynamoelectric machine such as a hydrogenerator. The rotor 25 incorporates a liquid cooling system made in accordance with the invention. The rotor 25 includes a rotatably mounted shaft 27 with a central bore 28 therethrough; a rim 29, made for example from a plurality of ring-shaped laminates mounted on said shaft 27; and a multiplicity of salient poles 30 mounted about the periphery of said rim 29, each of said poles 30 including a coil 31 of conductor. A plurality of axial coolant pipes 35 are disposed in the shaft's bore 28. The axial pipes 35 include an intake pipe 35a, and an outtake pipe 35b disposed concentrically about said intake pipe 35a. The axial pipes 35a,b are connected at their first end to a coolant box 40 which includes the rotating/stationary seal needed to pass a liquid coolant, for example water, to and from the rotor. Within the water box 40 the axial coolant intake 35a is hydraulically connected to one end of a rotor inlet pipe 42a which is capable of introducing coolant into said intake pipe 35a. The axial outtake pipe 35b is therein hydraulically connected to one end of a rotor discharge pipe 42b which is capable of directing the coolant from the machine. The other ends of the rotor inlet pipe 42a and discharge pipe 42b are connectable to an external coolant supply system (not shown). Inlet pipe 42a and discharge pipe 42b are preferably of a flexible nature. At the other end of the axial pipes 35a,b is located a distribution block 44. The distribution block 44 provides hydraulic interconnection between the axial coolant pipes 35a,b and a plurality of radially-directed coolant pipes 50. The distribution block 44 is disposed within the shaft's bore 28 and is of a two-part construction, for example, having a base portion 45 and a cover portion 46 which fits over the base. The base portion 45 has therein a plurality of pipe-connecting features 48 which shall be discussed below. The radial piping 50 is connected between the distribution block 44 and a manifold 52. The manifold includes a plurality of arcuately-shaped coolant pipes 53 which direct the coolant circumferentially about the periphery of the rotor rim 29, to which the pipes are slidably attached. The invention furthermore provides means 55 for hydraulically connecting the manifold 52 to the individual poles 30.

Also disposed within the shaft's bore 28 is an electrical connection block 36 which connects axially-directed, conductive leads 37a,b to radially-directed leads 38a,b. At the other end of the axial leads 37a,b are connected the slip rings 39a,b, which are electrically connectable by brushes to an external excitation source (not shown). A plurality of insulating cleats 41 act to maintain the concentricity of the axial pipe 35b relative to the shaft's bore 28, as well as to support the axial leads 37a,b.

Continued reference to this FIG. 1 will aid in the understanding of the relationships between the elements shown in the remaining drawings and described hereinafter. Other elements of the generator which are not shown include a cylindroid stator assembly mounted within a housing. The rotor 25 is rotatably mounted within the stator, and separated from it by an annular-shaped air gap.

Figure 2A:
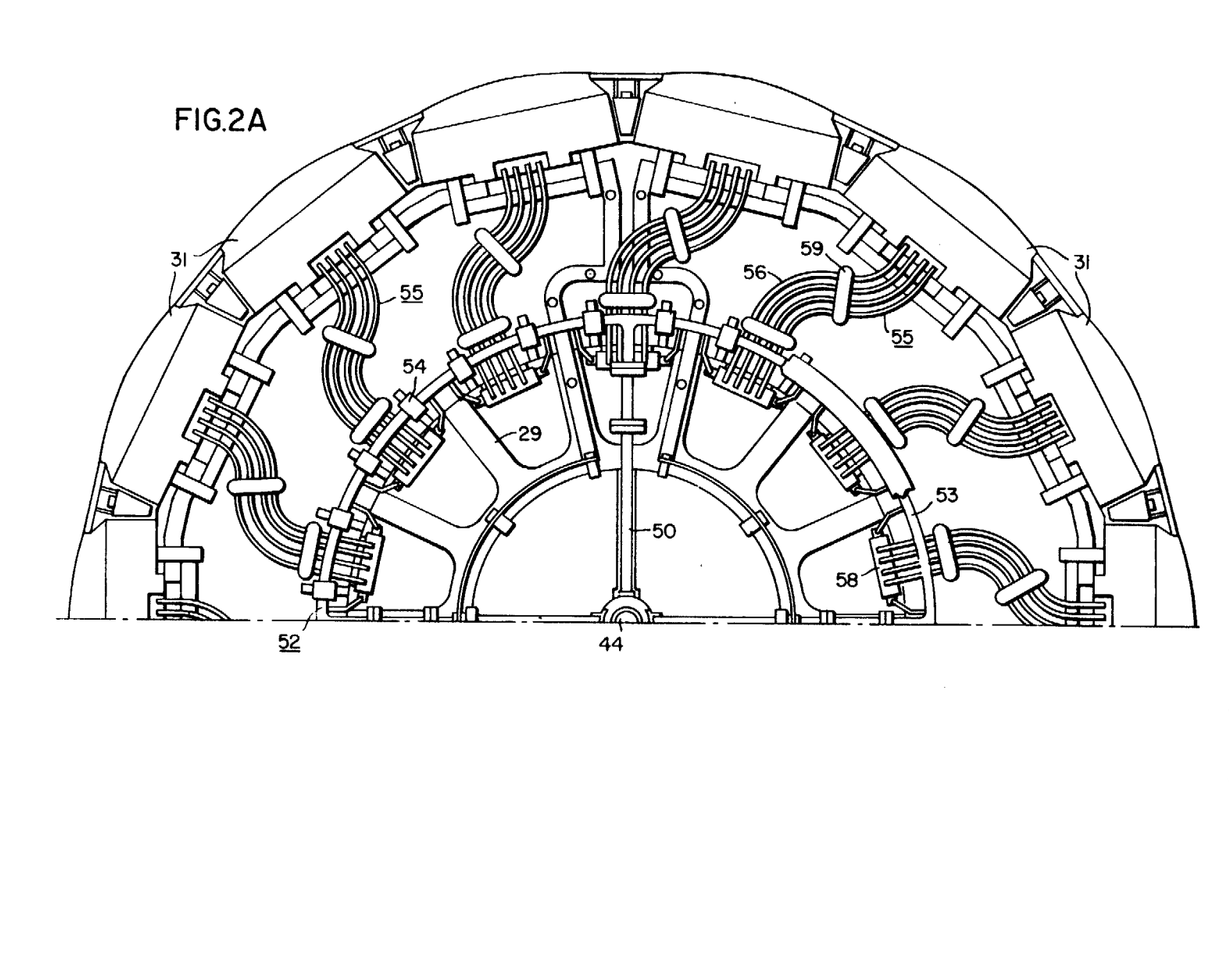
FIG. 2A is a partial end view of a hydrogenerator's rotor incorporating an embodiment of the invention.
Figure 2B:
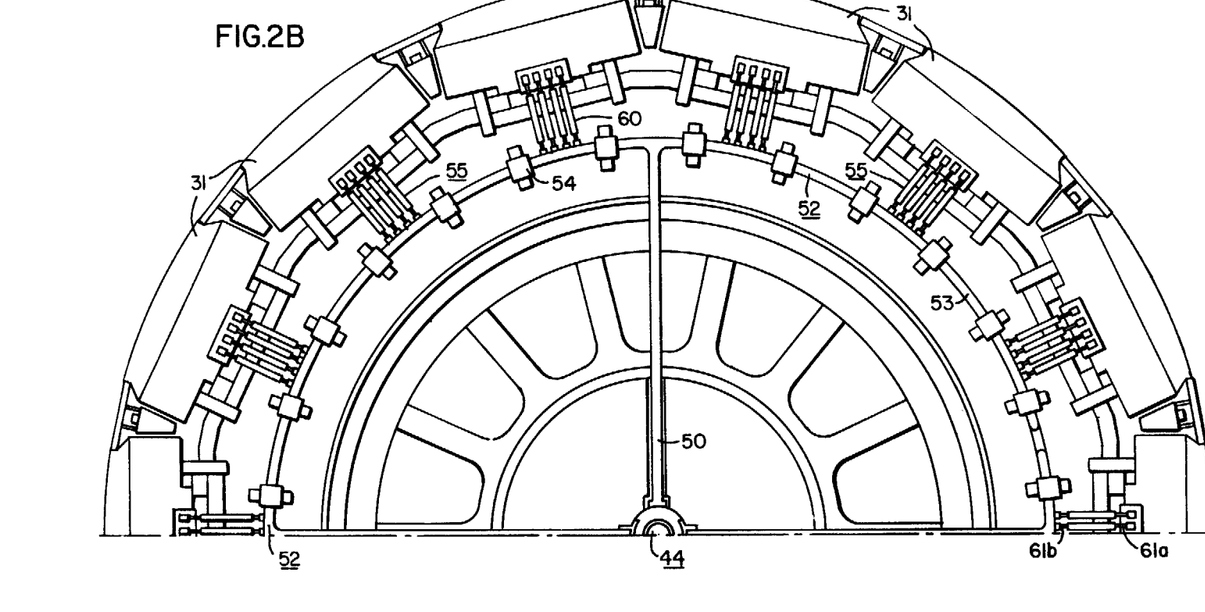
FIG. 2B is a partial end view of the hydrogenerator's rotor incorporating an alternative embodiment of the invention.

FIGS. 2A and 2B are sectional end views of the rotor 25 made in accordance with the invention. As an example, a fourteen pole generator is illustrated, through the invention is applicable to other sizes. The drawing further shows the key features of the invention, the manifold 52, the pole connecting means 55, and the distribution block 44. These shall be discussed in order, and set out under their respective headings.

MANIFOLD 52

The manifold 52 is typically rigidly attached to the rotor rim 29, for support against the centrifugal load. However, during various machine operating conditions, especially during start-up and shutdown, a temperature differential exists between the manifold 52 and the rim 29 which results in undesirable thermally-induced stresses when the manifold is rigidly attached.

The invention teaches the use of a manifold comprising the pipes 53 which distribute the coolant to the coils 31 of the machine. Each of the pipes 53 is an arcuate segment, preferably semicircular, and connected to one of the radial pipes 50. Each of the pipes 53 is held against the centrifugal load by a plurality of supports or collars 54 which are fixedly attached to the rotor rim 29. The pipes 53 are held in the supports 54 so as to permit slight expansion or contraction along their length resulting from the various thermal transients.

Figure 3:
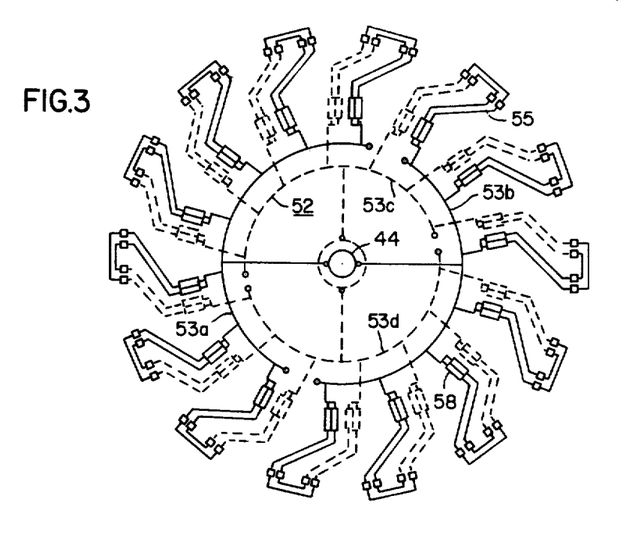
FIG. 3 is a schematic of the hydraulic path for the invention shown in FIG. 2A.

Exemplifying, the manifold 52 includes four pipes 53a-d (shown in FIGS. 3 and 4) and a plurality of supports 54 for bracing each of said pipes. Each of the pipes 53a-d extends 180° about the rotor 25, in two axially-spaced planes. This can best be seen in FIGS. 3 and 4, which are schematics of the hydraulic path in the rotor. Two points are to be noted about these drawings. First, FIG. 3 is the hydraulic schematic for FIG. 2A while FIG. 4 corresponds to FIG. 2B. The manifolds in these drawings are alike, the differences being the pole connecting means which is hereinafter described. And second, the two axially-spaced planes are shown for purposes of illustration in FIGS. 3 and 4 as being radially-spaced. Thus it should be understood that in practice the pipes 53a,b are at the same radius from the centerline of the rotor as pipes 53c,d. In the Figures, the ends of pipes 53a,b are skewed by 45° relative to the ends of pipes 53c,d. In addition, the poles 30 are hydraulically serviced via parallel paths from the manifold 52, while the coolant flows in two parallel paths between the manifolds 52 and the distribution block 44 disposed in the rotor's shaft 27. This achieves an equal hydraulic flow path for each of the poles 30.

POLE CONNECTING MEANS 55

Since the manifold 52 is mounted to permit a certain amount of circumferential slippage due to thermal gradients, the pole connecting means 55 must likewise accommodate such displacement. Furthermore, these connections must allow sufficient flexibility for any separation between the rim 29 and the poles 30 at overspeed conditions. Electrical insulation must be maintained between the manifold 52 and the coils 31. The invention embraces two alternative designs for the pole connecting means 55 that meet these objectives. The first utilizes tubing 56 having S-bends, and an insulating connector 58. The second uses a braided hose.

The two designs can be seen in FIGS. 2A, 2B, 3 and 4. In FIG. 2A and FIG. 3 the first embodiment for the manifold connecting means 55, employing the S-bent tubing 56, is illustrated. For example, the tubing 56 is constructed from a stainless steel. This design also uses the insulating connector 58, located along the inner diameter of the top of the rotor rim 29, which comprises a tube which is for example made from Teflon ® and wrapped with a shell made of a glass epoxy. The shell provides the connector with the strength to withstand internal pressures. Each insulating connector 58 connects the tubes 56 to the manifold's piping 53.

To provide the necessary flexibility between the coils 31 and the insulating connectors 58, the tubing 56 is shaped into the form generally reminiscent of the letter "S". The arcs in this shape offer sufficient flexibility to allow the coil 31 and the rim 29 a certain amount of radial displacement. The tubes 56 are supported along their midlength by tube supports 59. The tube supports 59, for example, are made of an elastic material which allows small deflections associated with differential movement of the ends of the arcs of the bends, but prevent any large deflections resulting from the centrifugal load.

Figure 4:
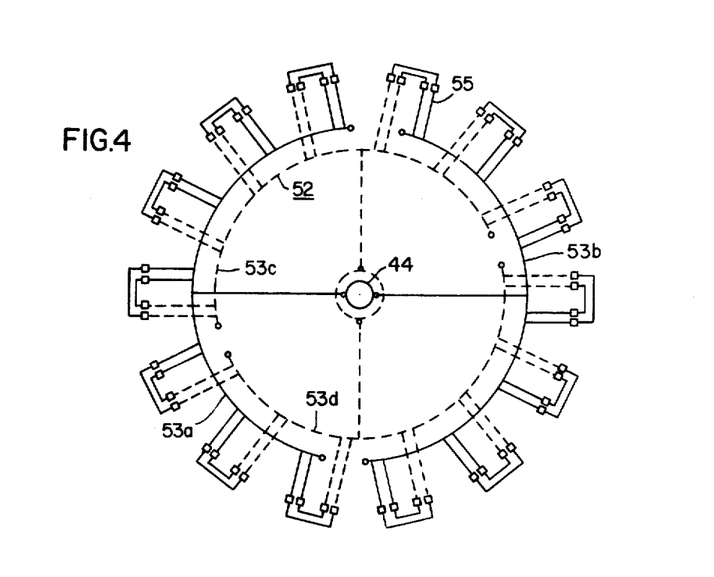
FIG. 4 is a schematic of the hydraulic path for the invention shown in FIG. 2B.

The alternative embodiment to that just described in shown in FIG. 2B and FIG. 4. An insulated flexible hose 60 is provided to connect the manifold 52 to the individual coils 31. Preferably hose 60 is of a two-part construction. For example, an inner layer is made of a Teflon material. About the inner layer is wrapped a multiplicity of outer layers preferably made from an insulating fiber such as Kevlar ®. A Kevlar braid is noted for its strength, stiffness, and toughness since it has found usage and testing in the aerospace industry. At each end of the hose 60 is a mechanical fitting 61a–b for making the appropriate hydraulic connections. Preferably these fittings 61 permit and facilitate easy removal and installation of the pole connecting means 55. Referring now to the aforementioned FIGS. 3 and 4, these are hydraulic schematics of the coolant paths associated with their respective embodiments showing the manifold connecting means 55 just described. Within these figures the solid lines indicate coolant inlets and the dotted lines indicate coolant outlets from the poles 30. It should be understood that these are examples of the flow direction of the coolant, but are by no means the exclusive flow path appropriate for the invention.

Figure 5:
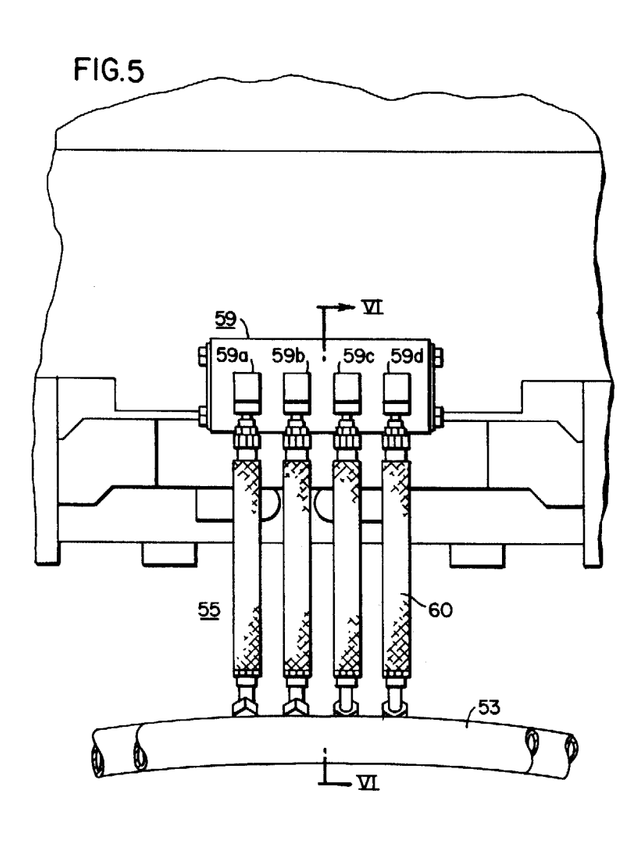
FIG. 5 is an enlarged sectional view of means for hydraulically connecting the manifold to each of the individual poles which is illustrated in FIG. 2B.
Figure 6:
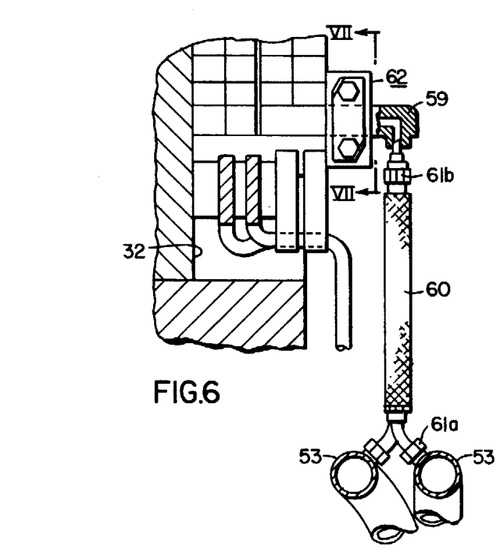
FIG. 6 is a side view of the connecting means shown in FIG. 5.
Figure 7:
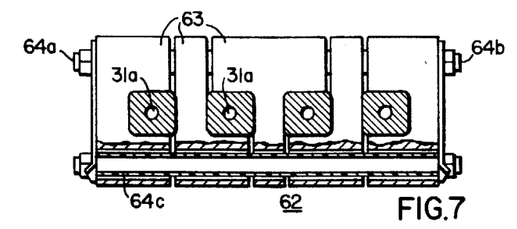
FIG. 7 is a sectional view of the pole connecting means taken along line VII—VII in FIG. 6.

FIGS. 5–7 show with greater detail the hydraulic connection to the poles incorporating the braided Teflon hose 60. Referring now specifically to FIG. 5, a segment of one of the manifold pipes 53 is connected by the hoses 60 to the coil leads 59. It should be noted that this drawing particularly illustrates the connection to the poles 30 wound in accordance with the invention claimed in the aforementioned patent application Ser. No. 249,306. The actual connections to the coil leads 59 are disposed within a cutout 32 within the rotor rim 29. As detailed in the aforementioned invention, each of the coils 31 include two helices of conductor (not separately shown), each of the helices including two layers of conductor. For easy understanding of this, the coil leads 59 are numbered 59a through 59d. Coil leads 59a and 59b, for example, are the lead-outs from the associated two layers of the first helix of conductor, and leads Nos. 59c and 59d are brought out from the two layers of the second helix. The coil leads 59 are mechanically supported in a lead mount 62, shown in detail in FIG. 7. The mount 62 is made for example of a multiplicity of segments 63 made for example of a Micarta or glass epoxy material. The segments 63 are held in assembled form by a plurality of bolts 64a equipped with threadedly mating bolt nuts 64b. It may be desirable to insulate the bolts with a glass fiber tube 64c.

Referring now specifically to the aforementioned FIG. 6, the overall connection to the individual poles 30 is illustrated. For purposes of the description, the elements shall be described from the bottom of the Figure towards the pole's coil at the top of the FIG. 2. The radial pipes 50 are each connected to two manifold pipes 53 which service the pole. The manifold pipes 53 are connected by mechanical fittings 61a to the hoses 60. At the other end of the hoses 60, mechanical fittings 61b connect the hoses to the individual coil leads 59. The connection for example may be made from the radially inward side of the leads 59 at which location the pipe fitting 61b can be brazed to the leads 59 in such manner as to be in hydraulic communication with center bores 31a within the coils 31. As an example of a typical coolant flow path, refer once again to FIGS. 5 and 6 in which are designated one possible coolant flow direction. The cold coolant flows through the appropriately marked manifold pipe up into coil leads No. 59a and 59b and thereafter circulate through the conductor wound about the pole. The heat laden coolant returns through coil leads Nos. 59c and 59d down the pole connecting means 55 and out through the appropriately marked manifold pipe.

DISTRIBUTION BLOCK 44

Figure 8:
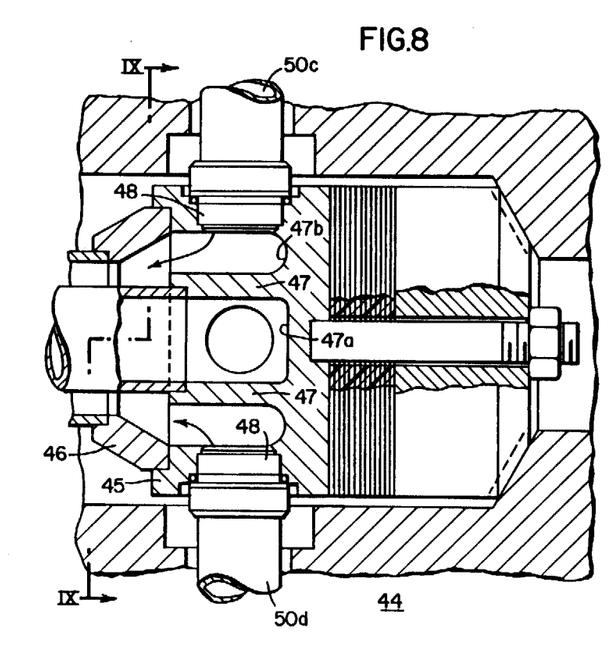
FIG. 8 is a sectional view of a distribution block made in accordance with the invention, containing a cutaway particularly showing the hot-coolant connection between the axial and radial piping.
Figures 10, 11:
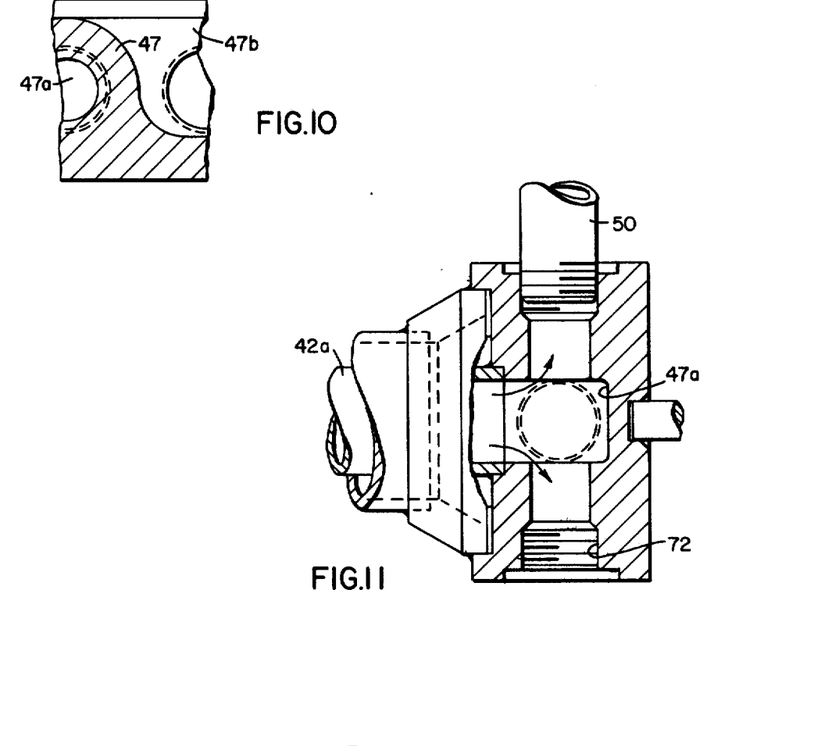
FIG. 10 is a developed view taken along line X—X in FIG. 9, showing the inner wall structure in the distribution block.
FIG. 11 is a sectional view of the distribution block made in accordance with the invention and particularly showing the cold-coolant connection between the axial and radial piping.

FIG. 8 is a detailed view of the distribution block 44 which was introduced in the above discussion of FIG. 1. The distribution block 44 acts as a hydraulic interconnection between the axial pipes 35 and the radial pipes 50. A novel feature of the distribution block 44 is its configuration, having a plurality of cavities formed by inner wall structure 47. The distribution block 44 comprises a base portion 45 and a cover portion 46. The base 45 includes an inner chamber 47a which acts as a coolant inlet, and an outer chamber 47b which acts as a coolant outlet. The distribution block 44 is sectioned in FIG. 8 to show the connection between the radial piping 50 carrying the heat laden coolant and the outer chamber 47b which discharges the heat laden coolant into the outer concentric pipe 42b. FIG. 11 shows the connection between the inlet axial pipe 42a, the inner chamber 47a and the radial piping 50 carrying the cold coolant. On both of these drawings the flow path is appropriately marked with arrows.

Figure 9:
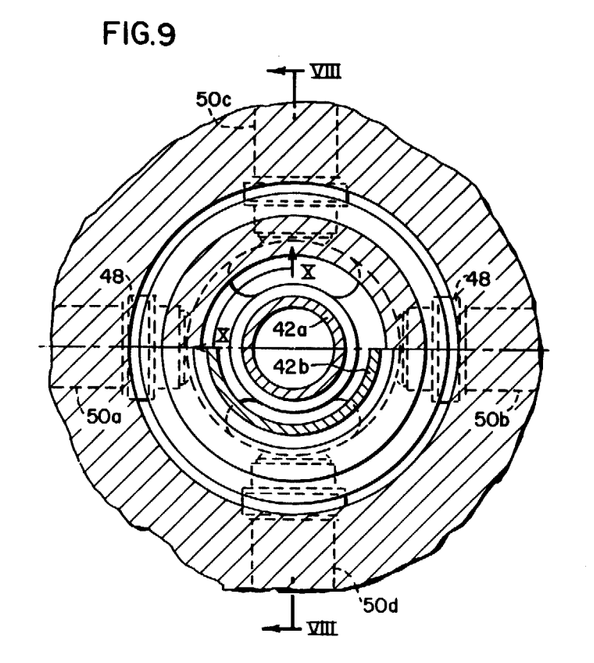
FIG. 9 is a sectional view taken along line IX—IX of FIG. 8.
Figure 12:
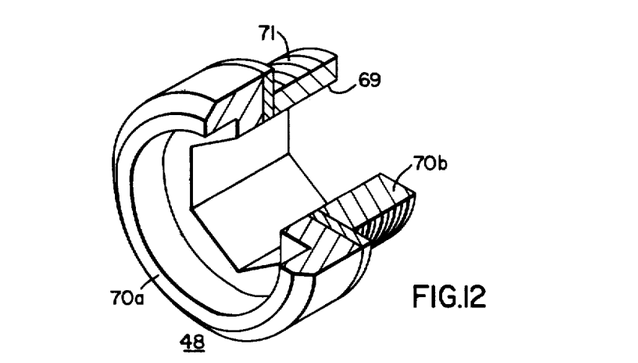
FIG. 12 is a perspective illustration showing a radial pipe fitting used to connect the radial pipes with the distribution block and having a hex-shaped through hole.

FIG. 9 shows a cross-sectional view of the distribution block 44 taken along line IX—IX in FIG. 8. It is apparent from FIG. 9 that four radial pipes 50 are connected to the concentric pipes 42a,b by the distribution block 44. This number of radial pipes 50 is used as a typical example of the connections, though more or less may be implemented as needed. In the drawing two diametrically opposite radial pipes 50a and 50b carry the cold coolant while the other two diametrically opposite radial pipes 50c and 50d carry the heat laden coolant. While the axial pipes 42a,b may, for example, be welded to the distribution block 44, the radial pipes are preferably mechanically attached to the distribution block 44 by a plurality of radial pipe fittings 48. One of the fittings 48 is shown in FIG. 12. It can be seen from the Figure that the fittings 48 have a hex-shaped through hole 69 and are made of a generally two-part construction. A first part 70a is, for example, welded to the radial pipes 50. A second part 70b is provided, for example, with threads 71 which engage threads disposed within radial ports 72 in the distribution block 44. For example, it may have a straight threaded O-ring boss. In assembling the radial pipes 50 to the distribution block 44, the radial pipes 50 are first welded to the fittings 48. Then they are tightened into the block 44 through the use, for example, of a long hex wrench (not shown) which mates with the hex-shaped through-hole 69 and thereby is capable of turning each of the fittings 48 relative to the block 44. This permits expeditious disassembly without the need to cut any of the piping, since after the radial pipes 50 are removed from the block 44 the axial pipes 42a,b and the distribution block 44 can be removed from the rotor 25.

Important to the invention is the internal geometry of the distribution block 44. The inner wall structure 47 can be best understood by reference specifically to FIG. 10. FIG. 10 is a sectional view taken along line X—X in FIG. 9. The inner wall structure 47 can be produced for example by using a spherical cutter to machine uniform radii in the block 44. This would form the sinusoidal appearance seen in FIG. 10. Note that this straightforward manufacturing technique permits the distribution block 44 to be manufactured from a minimal number of parts, for example the base portion 45a covered by cover portion 46. This may perhaps need further explanation. For purposes of illustration consider a probe which would follow line X—X in FIG. 9 which extends at a set radius from the centerline of the distribution block 44. In tracing the surface it should be understood that the probe would be riding on the inner wall structure 47 which both defines as well as hydraulically separates the inner and outer chambers 47a,b. Thus the inner wall structure 47 acts to partition the inside of the distribution block 44 into the respective chambers 47a,b. The probe inserted down into the plane of the paper would ride along the inner wall structure 47 disposed in the outer chamber 47b and then ride over the inner wall structure 47 which surrounds the inner chamber 47a. The tip of the probe would define the generally sinusoidal-shaped curve seen in FIG. 10.

It should now be apparent that a practical structure and system for supplying liquid coolant to the salient poles of a hydrogenerator has been herein provided.

What is claimed is:

1. A liquid-cooling system for a dynamoelectric machine's rotor having a rotatably mounted shaft with a central bore therethrough; a rim mounted on said shaft; and a multiplicity of salient poles mounted about a periphery of said rim, each of said salient poles including a coil of conductor; said cooling system comprising:
   (A) a plurality of axial-coolant pipes including an intake pipe, and an outtake pipe concentrically disposed about said intake pipe;
   (B) a rotor inlet pipe connected to said intake pipe, and connectable at its other end to an external coolant supply system;
   (C) a rotor discharge pipe connected to said outtake pipe, and connectable to said external coolant supply system;
   (D) a manifold including a plurality of arcuately-shaped coolant pipes;
   (E) a plurality of radially-directed pipes which hydraulically connect to said manifold, a preselected number of said radially-directed pipes being connected to said manifold to carry coolant to said salient poles, an other preselected number of said radially-directed pipes connected to said manifold to carry coolant away from said salient poles;
   (F) a distribution block which is connected to said axial-coolant pipes and to said radially-directed pipes, said distribution block being disposed in said bore and including a base having pipe-connecting features and means for covering said base;
   (G) means for circulating coolant within each of said salient poles; and
   (H) means for connecting said manifold to said coolant circulating means.

2. The liquid-cooling system of claim 1 wherein said coolant circulating means is a central bore disposed in the conductor.

3. The liquid-cooling system of claim 1 wherein the distribution block includes inner wall structure which defines a plurality of chambers; said chambers including an inner chamber which hydraulically interconnects said intake pipe to those radially-directed pipes carrying coolant to the salient poles, and an outer chamber which interconnects the outtake pipe with those radially-directed pipes carrying coolant from the salient poles.

4. The liquid-cooling system of claim 3 wherein the axial-coolant pipes are welded to the distribution block, and further comprising mechanical fittings for connecting said radially-directed pipes to said distribution block.

5. The liquid-cooling system of claim 4 wherein the mechanical fittings include a hex-shaped through hole, and a threaded portion which mates with a similarly threaded radial hole in the distribution block.

6. The liquid-cooling system of claim 1 wherein said manifold includes a plurality of arcuate pipes and a plurality of pipe supports; whereby each of the pipes is slidably mounted within said supports and said supports are attached to the rotor rim.

7. The liquid-cooling system of claim 1 wherein the connecting means comprises a plurality of tubes having along their length an S-bend region.

8. The liquid-cooling system of claim 7 wherein the connecting means further comprises a plurality of insulating connectors, each insulating connector connecting one of said tubes to a coil lead in one of the poles.

9. The liquid-cooling system of claim 1 wherein the connecting means includes a plurality of flexible hoses, each hose constructed of an inner layer surrounded by at least one layer of a braided material having a predetermined strength stiffness and toughness.

10. The liquid-cooling system of claim 9 wherein the braided material is an aramid fiber.

11. A cooling system for a hydrogenerator, comprising:
   a rotor having a plurality of salient poles attached to the periphery of said rotor, said rotor having a central bore therethrough, said bore being concentric and coaxial with said rotor;
   an intake pipe disposed axially within said bore;
   an outtake pipe disposed axially within said bore, said intake and outtake pipes being generally coaxial with each other and with said bore;
   means for supplying a flow of coolant to said intake pipe;
   means for removing a flow of coolant from said outtake pipe;
   a first manifold, said first manifold including a first arcuately-shaped pipe;
   a second manifold, said second manifold including a second arcuately-shaped pipe;
   a distribution block connected to said intake and outtake pipes;
   a first means for connecting said first manifold to said distribution block, said connecting means providing fluid communication between said first manifold and said intake pipe;
   a second means for connecting said second manifold to said distribution block, said connecting means providing fluid communication between said second manifold and said outtake pipe;
   a third means for connecting said first manifold in fluid communication with a first group of said salient poles; and
   a fourth means for connecting said second manifold in fluid communication with a second group of said salient poles.

12. The cooling system of claim 11, wherein:
said first and second manifolds are disposed in separate planes which are generally perpendicular to said bore;
said first and second connecting means each include at least one radially disposed pipe;
said third and fourth connecting means each include a plurality of pipes; and
said distribution block is disposed within said bore and has a first channel shaped to provide fluid communication between said first connecting means and said intake pipe and a second channel shaped to provide fluid communication between said second connecting means and said outtake pipe.

* * * * *